United States Patent
Thubert et al.

(10) Patent No.: US 9,019,824 B2
(45) Date of Patent: Apr. 28, 2015

(54) PRIORITIZED QUEUEING IN A MESH NETWORK BASED ON AGE OF PAYLOAD DATA

(71) Applicant: Cisco Technology, Inc., San Jose, CA (US)

(72) Inventors: Pascal Thubert, La Colle sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 216 days.

(21) Appl. No.: 13/768,375

(22) Filed: Feb. 15, 2013

(65) Prior Publication Data

US 2014/0233375 A1 Aug. 21, 2014

(51) Int. Cl.
*G01R 31/08* (2006.01)
*H04W 72/12* (2009.01)
*H04W 84/18* (2009.01)

(52) U.S. Cl.
CPC ...... *H04W 72/1242* (2013.01); *H04W 72/1221* (2013.01); *H04W 84/18* (2013.01)

(58) Field of Classification Search
USPC ........................................................ 370/230
See application file for complete search history.

(56) References Cited

U.S. PATENT DOCUMENTS

| | | | |
|---|---|---|---|
| 7,542,478 B1 * | 6/2009 | Ozer et al. | 370/447 |
| 8,072,910 B2 | 12/2011 | Thubert et al. | |
| 8,085,686 B2 | 12/2011 | Thubert et al. | |
| 8,228,954 B2 | 7/2012 | Thubert et al. | |
| 8,428,069 B2 * | 4/2013 | Howe | 370/395.51 |
| 2008/0043638 A1 * | 2/2008 | Ribiere et al. | 370/254 |
| 2012/0082034 A1 * | 4/2012 | Vasseur | 370/235 |
| 2012/0106549 A1 * | 5/2012 | Yousefi et al. | 370/392 |

OTHER PUBLICATIONS

Vasseur, "Terminology in Low power And Lossy Networks", [online] Network Working Group, Internet Draft, Sep. 14, 2011, [retrieved on Jan. 29, 2013]. Retrieved from the Internet: <URL: http://tools.ietf.org/html/draft-ietf-roll-terminology-06>, pp. 1-8.

(Continued)

*Primary Examiner* — Brian Roberts
*Assistant Examiner* — Shah R Zaman
(74) *Attorney, Agent, or Firm* — Leon R. Turkevich (57) ABSTRACT

In one embodiment, a method comprises identifying an age of payload data in a data packet by a wireless network node configured for transmitting the data packet to a multi-hop destination via a wireless mesh network; determining by the wireless network node a schedule for the data packet reaching the multi-hop destination; and the wireless network node prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the wireless network node to the destination, where a higher-aged data packet relative to the schedule is granted a higher priority than a lower-aged data packet relative to the schedule.

20 Claims, 5 Drawing Sheets

(56) References Cited

OTHER PUBLICATIONS

Nawab et al., "MAC-layer Protocol for TCP Fairness in Wireless Mesh Networks", [online], 2012 1st IEEE International Conference on Communications in China (ICCC), Aug. 15-17, 2012, [retrieved on Jan. 31, 2013]. Retrieved from the Internet: <URL:http://202.194.20.8/proc/iccc12/papers/p507-nawab.pdf>, pp. 507-512.

Winter, Ed., et al., "RPL: Routing Protocol for Low-Power and Lossy Networks", [online], Mar. 2012, [retrieved on Nov. 26, 2012]. Internet Engineering Task Force, Request for Comments: 6550, ISSN 2070-1721. Retrieved from the Internet: <URL: http://tools.ietf.org/pdf/rfc6550>, pp. 1-157.

Lohman, "Wireless Introduction" [online], Mar. 1, 2010, [retrieved on Jan. 29, 2013]. Retrieved from the Internet: <URL: http://www.hcf-files.com/webasyst/published/DD/html/scripts/getfolderfile_zoho.php?DL_ID=MTA5NQ%3D%3D&ID=72a7beb0a6eeba6aaf06ef19e00ce258&DB_KEY=V0VCRkIMRVM%3D>, pp. 1-11.

\* cited by examiner

PRIORITIZED QUEUEING IN A MESH NETWORK BASED ON AGE OF PAYLOAD DATA

TECHNICAL FIELD

The present disclosure generally relates to wireless mesh networks, for example wireless sensor mesh networks.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Wireless local area networks are being deployed in large-scale service areas using mesh network protocols (e.g., the Internet Engineering Task Force (IETF) Request for Comments (RFC) 6550) overlying wireless link layer protocols (e.g., IEEE 802.15.4e). Sensor mesh networks are being deployed using such mesh network protocols by sensor nodes to enable sensor data from remote sensor nodes to be transported within data packets to a destination controller, for example an executable application configured for monitoring the sensor data. Sensor mesh networks can be deployed for smart metering industrial sensor networks, building automation, etc. Each sensor node can include one or more sensors (e.g., video camera, weather sensor, smart utility meter, etc.) for collecting data; each sensor node also can be implemented as a sensor host node configured for joining a wireless mesh network configured for reaching the destination controller.

Sensor mesh networks can be deployed on a large scale that covers a large geographic area (e.g., a wireless mesh weather forecasting network), using centimeter-sized (or smaller) lower-power/battery-operated sensor host nodes, also referred to as "sensor dust". Smaller sensor host nodes such as the "sensor dust" have limited battery life, however, and therefore are limited in their ability in relaying data packets from other sensor host nodes throughout the wireless mesh network. Hence, large scale and low power sensor mesh networks need to avoid traffic congestion since the cost to retransmit a data packet can be very high with a very low chance of success in successfully retransmitting the data packet.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises identifying an age of payload data in a data packet by a wireless network node configured for transmitting the data packet to a multi-hop destination via a wireless mesh network; determining by the wireless network node a schedule for the data packet reaching the multi-hop destination; and the wireless network node prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the wireless network node to the destination, where a higher-aged data packet relative to the schedule is granted a higher priority than a lower-aged data packet relative to the schedule.

In another embodiment, logic is encoded in one or more non-transitory tangible media for execution and when executed by a machine is operable for: identifying an age of payload data in a data packet by a wireless network node configured for transmitting the data packet to a multi-hop destination via a wireless mesh network; determining by the wireless network node a schedule for the data packet reaching the multi-hop destination; and the wireless network node prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the wireless network node to the destination, where a higher-aged data packet relative to the schedule is granted a higher priority than a lower-aged data packet relative to the schedule.

In yet another embodiment, an apparatus comprises a memory circuit configured for storing a data packet containing payload data, a wireless network interface circuit, and a processor circuit. The apparatus is implemented as a wireless network node. The wireless network interface circuit is configured for transmitting the data packet to a multi-hop destination via a wireless mesh network. The processor circuit is configured for: identifying an age of the payload data, determining a schedule for the data packet reaching the multi-hop destination, and prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the apparatus to the destination, where a higher-aged data packet relative to the schedule is granted a higher priority than a lower-aged data packet relative to the schedule.

DETAILED DESCRIPTION

Figure 1:
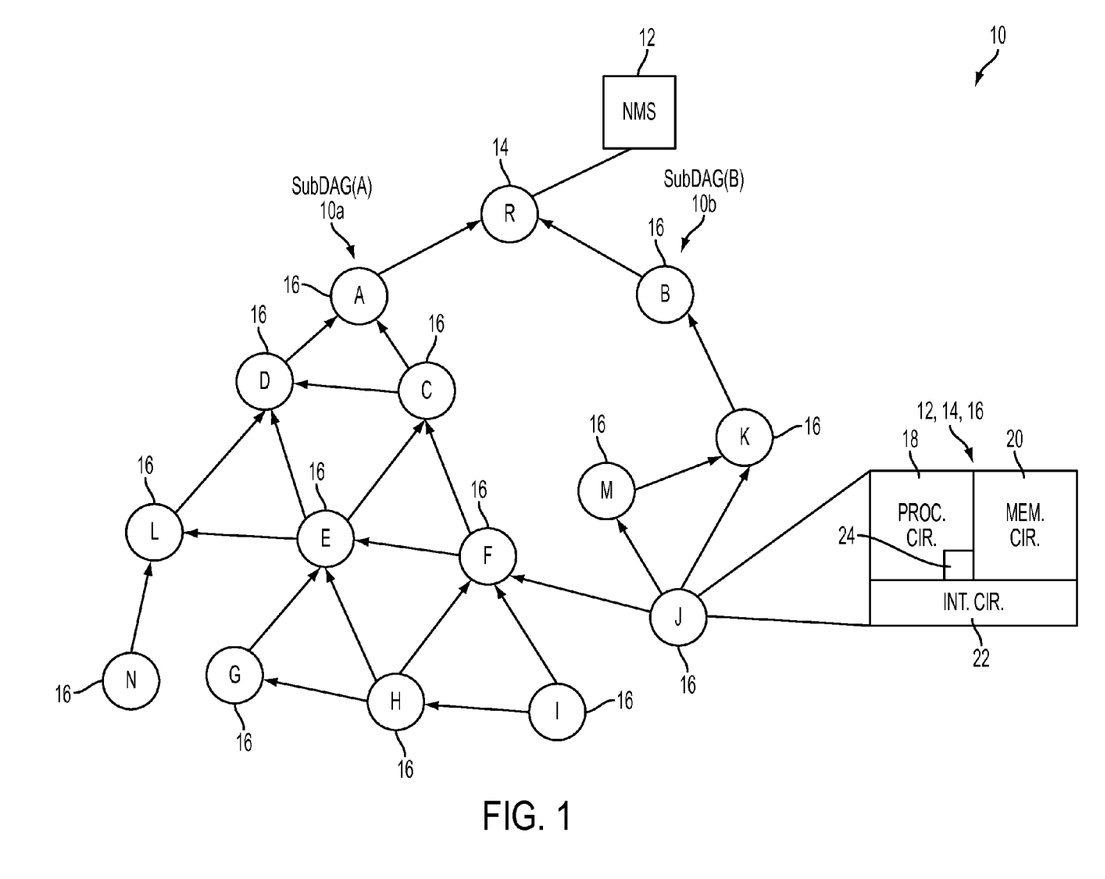
FIG. 1 illustrates an example wireless mesh network having wireless network nodes for prioritizing queuing of data packets for transmission based on the age of payload data and identified schedules for reaching a destination, according to an example embodiment.

FIG. 1 illustrates an example mesh network 10, according to an example embodiment. The mesh network 10 can include a centralized network management system (NMS) 12 for establishing a directed acyclic graph (DAG) for providing reachability to a destination (root) network node 14 by other wireless network nodes 16 via the mesh network 10. In one embodiment, DAG illustrated in FIG. 1 can include subDAGs 10a and 10b comprising subDAG parents "A" and "B", respectively. A tree topology for reaching the destination network node 14 also can be established by the NMS 12 in place of the DAG. The NMS can generate the DAG of FIG. 1 according to RFC 6550; alternately, the wireless network nodes 14, and 16 can be configured to create the DAG of FIG. 1 in a distributed and coordinated manner (e.g., in accordance with RFC 6550), without relying on the NMS 12. As described in further detail below, each network node 12, 14, and 16 can include a processor circuit 18, a memory circuit 20, and a wireless network interface circuit 22. The NMS 12, the destination network node 14, and/or at least one of the wireless network nodes 16 optionally also can have a wired network interface circuit. Each network node 14 and 16 also can include one or more physical sensors 24 configured for generating sensor data; as such, the wireless network nodes 16 also can be referred to as wireless sensor nodes, or simply "sensor nodes".

The DAG topology enables sensor nodes (e.g., sensor node "I" and "J") 16 to send sensor data traffic to the destination root 14 via a selected one of multiple available paths that aggregate at either the subDAG root "A" or the subDAG root "B"; a tree topology, while providing one and only one path for a sensor node to the root "R" 14 of the tree, also would cause the sensor data traffic to aggregate at either first-hop nodes "A" or "B" 16 (relative to the root "R" 14). Consequently, the first-hop network nodes encounter substantial network traffic that can result in congestion, delayed packets, and possibly dropped packets.

Prior techniques for prioritizing traffic included "best effort QoS", and Time Synchronized Channel Hopping (TSCH). Best effort QoS, however, refers to the lowest priority level of QoS classes and is utilized when no guaranteed quality of service (QoS) can be provided. Best effort QoS is completely unpredictable and can result in increased latency and loss of individual packets, however best effort QoS provides a relatively high throughput. Prioritizing traffic based on TSCH techniques (e.g., Wireless HART or ISA 100.11.a) rely on a centralized network manager to configure each and every data flow in the network with an assigned time slice at each and every hop toward a destination: although the use of TSCH techniques that rely on a centralized network manager to schedule each and every data flow in the network is fully predictable, TSCH provides less throughput than best effort QoS, however, because if a scheduled data packet cannot be received during its allocated time slot by a next hop node, then the entire sequence of time slots for the corresponding data flow ends up as unused by the next hop node. Further, the substantial processing burdens on the centralized network manager to implement TSCH for every timeslot for each and every wireless network node is not scalable in wireless sensor mesh networks that can contain tens or hundreds of hops for tens, hundreds, or thousands of wireless mesh nodes.

A fundamental concern in sensor mesh networks is that data packets that originate at a network node located further from the root (e.g., node "I" of FIG. 1) endure a lower quality of service than data packets originating at another network node located closer to the root (e.g., node "C" of FIG. 1). The packets originating at further network nodes (e.g., node "I") must contend for access with other data packets transmitted by other network nodes for each hop; hence, the adverse effects of packet loss, latency, and jitter increase with the number of hops that must be traversed by a data packet. This concern is aggravated in a directed acyclic graph topology, where the number of hops encountered by the data traffic can vary greatly: as illustrated in FIG. 1, the number of hops from the wireless network node "I" 16 can vary from four (4) hops (via the path I-F-C-A-R) to seven (7) hops (via the path I-H-G-E-L-D-A-R or I-H-F-E-L-D-A-R).

Particular embodiments optimize the scheduling of data traffic to a destination within a mesh network operating according to a Collision Sense with Multiple Access and Collision Avoidance (CSMA-CA) protocol, where data frame priority is based on the age of the payload data, i.e., the age since the payload data was generated and first injected into the wireless mesh network 10. In one embodiment, the prioritized queuing can be based solely on a wireless network node determining an age of payload data in a data packet, and the wireless network node prioritizing the network node relative to a schedule for the data packet and the respective ages of other data packets awaiting transmission by the wireless network node: the scheduling can be either stateless (i.e., calculated by the network node based on information in the data packet), or stateful (i.e., based on a CSMA-CA schedule supplied by the NMS 12). Each wireless network node can adjust the relative priority of a received data packet based on whether the received data packet is "early" (i.e., received before the scheduled arrival), "on-time" (i.e. received substantially at the scheduled arrival), or "late" (i.e., received after the scheduled arrival). A data packet is received "substantially at the scheduled arrival" if the data packet reception begins before, during, or after the "scheduled arrival time" before the next idle state on the carrier channel, i.e., no other data packet is received until after the next idle state detected on the carrier channel.

Hence, the priority of data packets can be adjusted in a CSMA-CA network to adjust for their relative position in their schedule (e.g. "early", "on-time", or "late"), without relying on burdensome time-division multiplexed schemes, or loss of throughput. Hence, fair treatment of data packets can be provided close to the root network node 14 regardless of the origin (i.e., source network node) of the data packets, achieving a fair share priority mechanism within the wireless mesh network 10.

Figure 2:
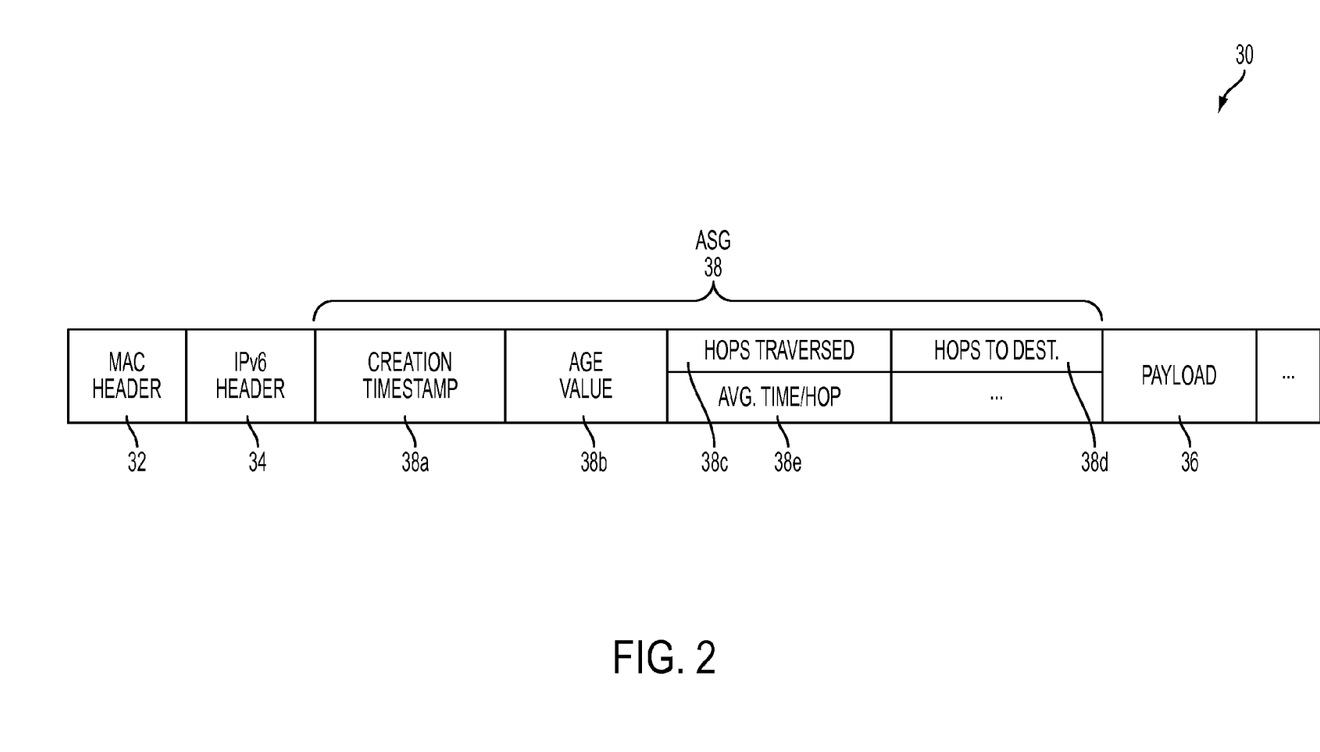
FIG. 2 illustrates an example data packet generated one of the wireless network nodes of FIG. 1 and having data fields for identification of the age of the corresponding data packet relative to an identified schedule, according to an example embodiment.

FIG. 2 illustrates a data packet 30 generated by a wireless network node 16, according to an example embodiment. The data packet can include a Media Access Control (MAC) layer header 32, an IP header (e.g., IPv6 header) 34, and an IP packet payload data 36 that can include sensor data or other network control data. The data packet 32 also can include age fields (also referred to as Age Since the information was Generated (ASG) fields) 38 that can describe the age of the payload data, relative to the distance the data packet 30 needs to travel to reach the destination root 14. For example, the data packet 30 can include a creation timestamp field 38a, an age value field 38b, a hops traversed field 38c, a hops-to-destination field 38d, and/or one or more time-to-hop fields 38e. As described in further detailed below with respect to FIGS. 3, 4A and 4B, the processor circuit 18 of a wireless network node 16 can set a field 38 in the data packet 30 indicating the age since the corresponding payload data was created in response to sensor data generated by the wireless network node.

In one embodiment, the data packet 30 can include the creation timestamp field 38a, where the processor circuit 18 can set a timestamp value based on one the payload data 36 (e.g., sensor data) was generated: the timestamp value 38a can be set by the processor circuit 18 to a time value that is substantially coincident with a network synchronized clock time, for example for sensor data; the timestamp value 38a also can be set by the processor circuit 18 to a time value that is earlier than the network synchronized clock time for higher priority based on a prescribed data type (e.g., control message in order network protocol data); the timestamp value 38a also can be set by the processor circuit 18 to a time value that is later than the network synchronized clock time for lower priority based on a prescribed data type (e.g., lower priority network node status data). The processor circuit 18 also can set an explicit age value within the age value field 38b specifying the age of the corresponding payload data 36, based on the processor circuit 18 accumulating time delays from the creation timestamp value 38a to any queuing delays or transmission delays of the data packet by the current or prior wireless network nodes. As described below, any network node 12, 14, or 16 can determine the age of the corresponding payload data 36 based on comparing the timestamp value 38a with the current time value of the network synchronized clock time for the wireless mesh network 10, or parsing the age value 38b that was updated by the last-hop network node.

Hence, the data fields 38 enable any of the wireless network nodes 16 to perform age-based scheduling of the data packets based on prioritizing queuing of the data packet based on the corresponding age relative to the schedule and respective ages of other data packets awaiting transmission by the wireless network node to the destination 14. Moreover, the data fields 38 enable the network management system 12 to determine the ages of all data packets 30 received by the root network node 14, enabling the network management system 12 to identify latent periods and congestion regions within the wireless mesh network 10; such aging information can enable the network management system 12 to analyze the evolution of latencies in the wireless mesh network 10 over time, enabling the NMS 12 to implement traffic shaping decisions for large data transfers (e.g., deferring firmware updates until minimal network activity), implementing a local repair in the network topology 10 (e.g., using RFC 6550), etc.

Each network node 12, 14, and 16 is a physical machine (i.e., a hardware device) configured for implementing network communications with other physical machines. Any of the disclosed circuits of the network nodes 12, 14, or 16 (including the processor circuit 18, the memory circuit 20, the wireless network interface circuit 22, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 20) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 20 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 20 can be implemented dynamically by the processor circuit 18, for example based on memory address assignment and partitioning executed by the processor circuit 18.

Figure 3:
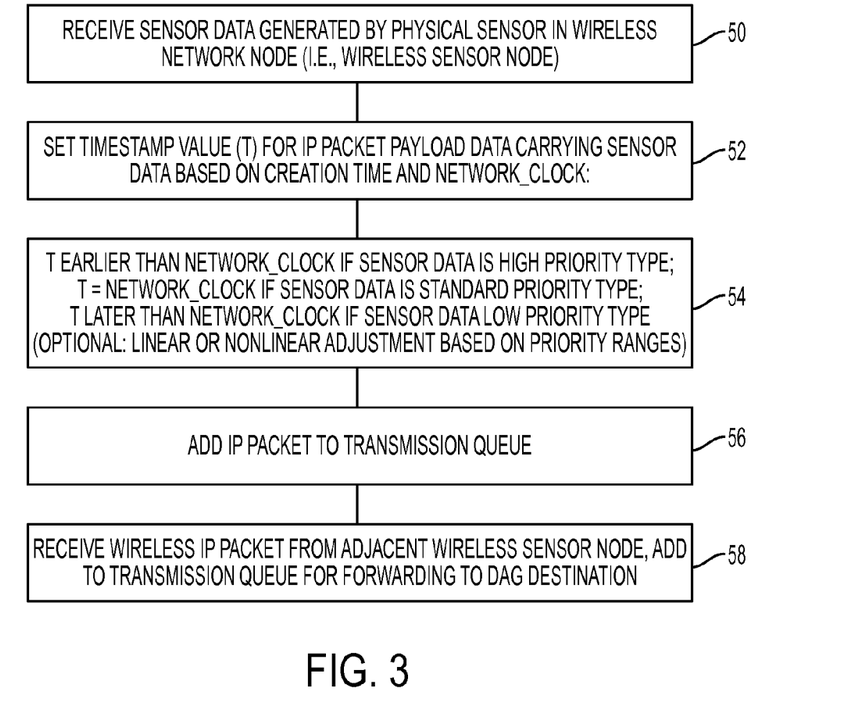
FIG. 3 illustrates identifying an age of the payload data of data packets carrying sensor data, according to an example embodiment.
Figure 4A:
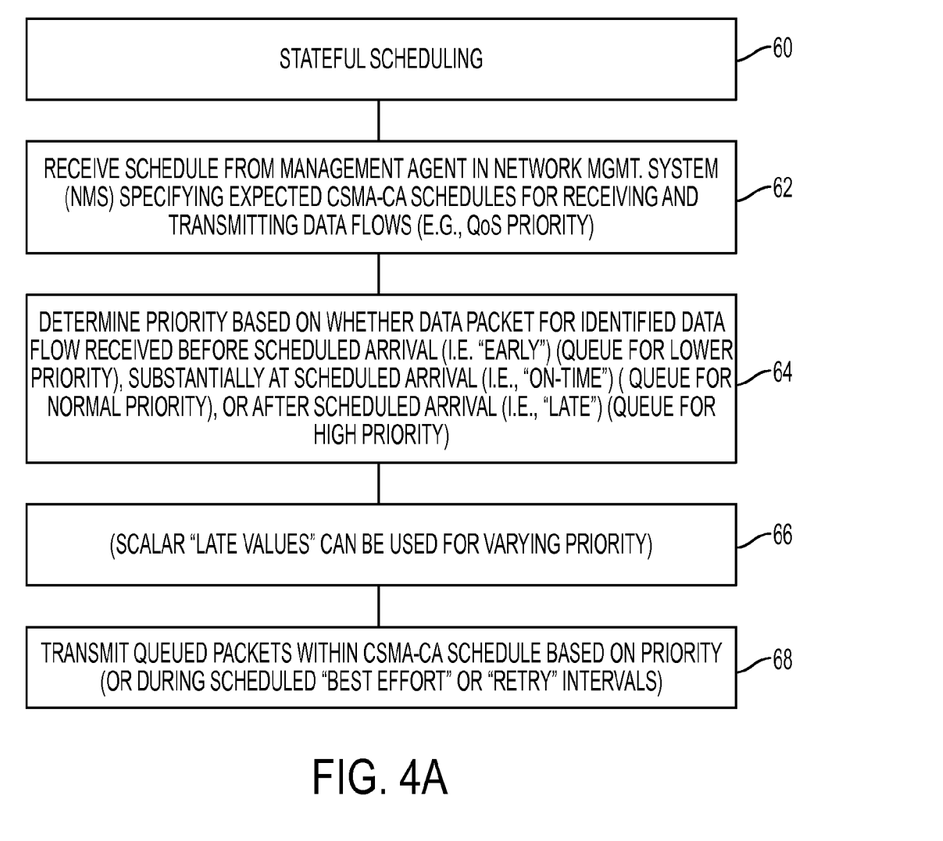
FIGS. 4A and 4B illustrate identifying the age of the payload data of data packets for stateful and stateless scheduling of the data packets for transmission based on the ages of the data packets, according to an example embodiment.
Figure 4B:
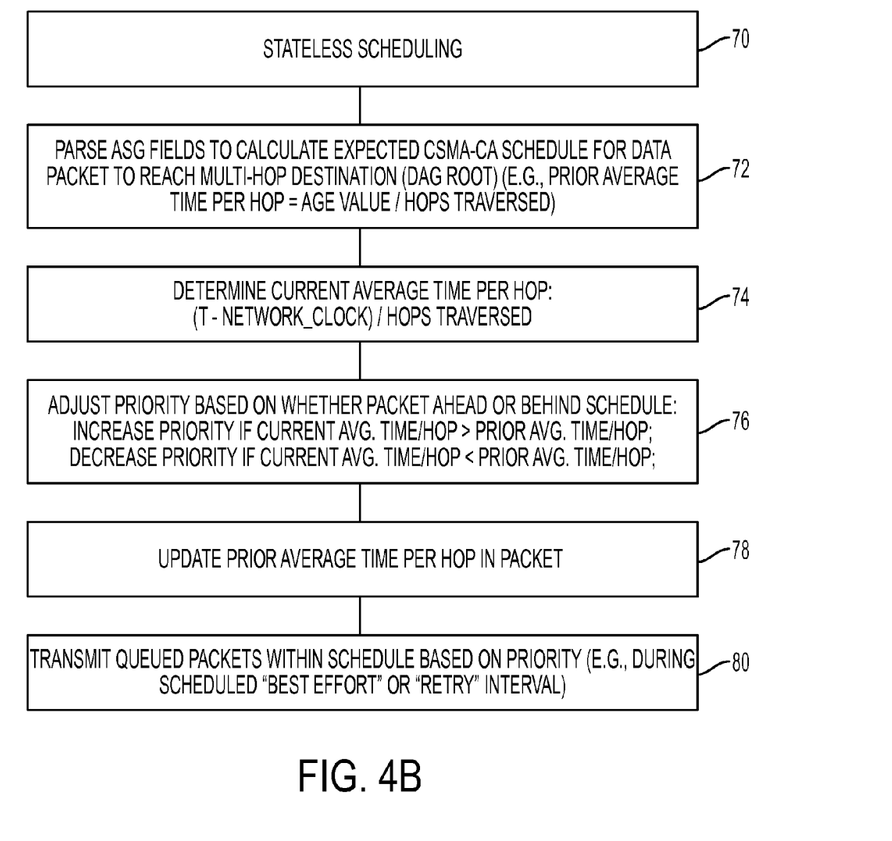

FIG. 3 illustrates a method by the processor circuit 18 of any wireless network node 16 identifying an age of the payload data 36 of data packets 30 carrying sensor data, according to an example embodiment. FIGS. 4A and 4B illustrate the processor circuit 24 of any wireless network node 16 identifying the age of the payload data of data packets for stateful and stateless scheduling of the data packets for transmission based on the ages of the data packets, according to an example embodiment. The operations described in FIGS. 3, 4A and 4B can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIG. 3 illustrates a wireless network node 16 acting as a source of sensor data that is injected into the wireless mesh network 10. Referring to operation 50, the processor circuit 18 of a wireless network node (e.g., network node "I") can receive sensor data generated by an attached physical sensor 24, and in response actively identify (e.g., establish) in operation 52 the age of the sensor data to be added as payload data 36 based on setting the timestamp value (T) in the creation timestamp field 38a relative to the current network synchronized clock time (NETWORK_CLOCK) relative to the creation time of the sensor data.

The processor circuit 18 can selectively set in operation 54 the timestamp value (T) relative to the current network synchronized clock time based on the data type for the sensor data: if in operation 54 the sensor data inserted into the payload data 36 is a high priority type (e.g., alarm data network management data, etc.), the processor circuit 18 can set the timestamp value (T) to be earlier than the network synchronized clock time (NETWORK_CLOCK); if the sensor data inserted into the payload data 36 is a standard priority type (e.g., conventional sensor data), the processor circuit 18 can set the timestamp value (T) to be substantially coincident with the network synchronized clock time (NETWORK- _CLOCK) ("substantially coincident with" refers to having the same value between the creation timestamp value T and the network clock, within the level of precision permitted between the network synchronized clock time and the creation timestamp value). If in operation 54 the sensor data inserted into the payload data 36 is a low priority type (e.g., status information regarding the wireless network node 16), the processor circuit 18 can set the timestamp value (T) to be later than the network synchronized clock time (NETWORK-_CLOCK). As illustrated in operation 54, more advanced adjustments can be made to the timestamp value, for example linear or nonlinear adjustments based on the relative priority ranges for various data types.

The processor circuit 18 completes packetizing the data packet 30 in operation 56, and can add the IP packet 30 (or link layer packet) to the transmission queue. Depending on implementation, the transmission queue can be implemented in system memory as part of the memory circuit 22, or within a separate and distinct memory circuit implemented as a dedicated transmission buffer within the wireless network interface circuit 22.

FIG. 3 also illustrates a wireless network node 16 operating as an intermediate next hop node (e.g., wireless network node "H" of FIG. 1) 16, where the corresponding network interface circuit 22 receives in operation 58 the wireless IP packet 30 from an adjacent wireless sensor node (e.g., wireless network node "I" of FIG. 1), and the corresponding processor circuit 18 of the intermediate next hop node 16 (e.g., "H") forwards the received wireless data packet 30 to the transmission queue for forwarding to the destination root 14. As described below, the processor circuit 18 of the immediate next hop node 16 also can update the relevant fields 38b, 38c, 38d, and/or 38e in response to reception of the data packet; alternately, the fields 38b, 38c, 38d, and/or 38e can be updated prior to actual transmission in order to account for queuing delays within the intermediate next hop node.

FIG. 4A illustrates stateful scheduling 60 of the data packets 30 based on the respective ages of the data packets, according to an example embodiment. The processor circuit 18 of each wireless network node 16 receives in operation 62 a corresponding schedule from the network management agent within a network management system 12 that specifies expected CSMA-CA schedules for receiving identified data flows, and transmitting the identified data flows, according to an example embodiment. In one embodiment, a schedule represents a "latency budget" for a data packet to reach the destination 14, where the data packet must travel from the source of the sensor data via the wireless mesh network 10 to the destination 14 before expiration of the latency budget. The latency budget can be set by the network management system 12 based on traffic management techniques, including measuring the average latency per hop for the received data packets based on the ASG fields 38. As described below, the latency budget also can be estimated by each wireless network node comparing the age of each received data packet relative to the number of total hops needed to reach the destination 14, relative to the other received data packets. The schedules can be implemented in the form of flow-based QoS policies established by the NMS flows, where certain data flows from certain sensor nodes are given a higher priority (e.g., a higher QoS value): the received schedules are stored in operation 62 by the processor circuit 18 into the memory circuit 20.

In response to reception of the schedules, the processor circuit 18 can establish a "reception window" for monitoring of a data packet 30 for an identified data flow, and determine whether the data packet 30 for the identified flow is received: before the scheduled arrival (i.e., is "early"), substantially at the scheduled arrival (i.e., is "on-time"), or after the scheduled arrival (i.e., is "late") relative to the latency budget. Hence, the processor circuit in operation 64 can determine the priority for a received data packet based on comparing the creation timestamp value 38a with the current network synchronized clock time, to determine whether the transmission duration indicates the data is received early, on time, or late, and adjust the priority values accordingly to adjust for early or late arrivals. Also note that scalar late values can be used for varying priority levels in operation 66. The processor circuit 24 in operation 68 queues the data packets 30 according to their relative priority values in accordance with the respective schedules in order to "realign" the data packets to their respective schedules. Hence, the wireless network interface circuit 22 in operation 60 can transmit the queued packets within the CSMA_SA schedule based on the priority; if necessary, late packets having been granted a high priority can be transmitted during scheduled "best effort" or "retry" intervals.

Hence, stateful scheduling 60 enjoys the advantage that the minimal amount of payload information is needed in a given data packet, however additional processing requirements are required in the form of the NMS 12 calculating a QoS based traffic table for each network node 16, and each network node 16 storing the traffic table in its memory circuit 20. These NMS calculations are relatively minimal, however, and scalable in large-scale sensor networks. Further, a wireless network interface circuit can adjust priorities for early or late data packets to enable each of the data packets to maintain their respective schedules.

FIG. 4B illustrates stateless scheduling 70 by a wireless network node, according to an example embodiment. Stateless scheduling 70 eliminates the necessity of the network management system 12, or locally-stored traffic tables, based on utilizing additional fields 38b 38c, 38d, and 38e in a received data packet 30.

Referring to operation 72 the processor circuit 18 can parse the ASG fields 38 to calculate an expected CSMA-SA schedule for the data packet 30 (relative to an estimated latency budget) to reach the multi-hop destination before expiration of the latency budget, for example based on parsing the prior average time per hop field 38e stored in the data packet 30: if preferred, a sequence of average time per hop fields 38e can be successively stored by each next-hop network node receiving the data packet 30, enabling the network node to determine the encountered delays on a per-hop basis; if no such field 38e is present, the processor circuit 18 can calculate the prior average time per hop based on dividing the age value specified in the age value field 38b by the number of hops traversed as specified in the hops traversed field 38c. Hence, the prior average time per hop represents the prior average that is calculated by the transmitting network node 16 (i.e., the previous-hop node). The processor circuit 24 in operation 74 can determine the current average time per hop to account for any transmission delays in the last hop, based on parsing the creation timestamp value 38a and subtracting the network clock value to determine the most up-to-date age of the payload 36, divided by the number of hops traversed as specified in the hops traversed field 38c (incremented by one, if needed by the processor circuit 18).

The processor circuit 18 can adjust in operation 76 the priority of the data packet based on whether the data packet 30 is ahead of schedule or behind schedule, as reflected by the current and prior average times per hop: the processor circuit 18 can increase the priority of the data packet 30 for queued transmission if the current average time per hop (calculated in operation 74) is greater than the prior average time per hop (calculated in operation 72), indicating that the most recent hop was slower than the prior average time per hop encountered by the transmitting network node; the processor circuit 18 also can decrease the priority of the data packet 30 for queued transmission if the current average time per hop (calculated in operation 74) is less than the prior average time per hop (calculated in operation 72), indicating that the most recent hop was faster than the prior average time per hop encountered by the transmitting network node.

The processor circuit 18 also can update the prior average time per hop field 38e in operation 78, as well as increment the hops traversed field 38c and decrement the hops to destination field 38d. The processor circuit 18 also can update the age value 38b with the difference between the creation timestamp value 38a and the network synchronized clock time is calculated in operation 74, prior to transmission in operation 80 of the queued data packets 30 by the network interface circuit 22 according to the establish priorities.

According to example embodiments, a fair share method is provided for a mesh topology and that computes a packet priority based on the time that the payload data 36 was generated, including time already spent in the mesh network 10. The example embodiments enable the packets to maintain a fair schedule in a scalable manner to reach a destination before expiration of a latency budget, without relying on time division multiplexing schemes that suffer from reduced throughput.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
identifying an age of payload data in a data packet by a wireless network node configured for transmitting the data packet to a multi-hop destination via a wireless mesh network;
determining by the wireless network node a schedule for the data packet reaching the multi-hop destination; and
the wireless network node prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the wireless network node to the destination, where a higher-aged data packet relative to the schedule is granted a higher priority than a lower-aged data packet relative to the schedule.

2. The method of claim 1, wherein the identifying is based on the wireless network node setting a field in the data packet indicating the age since the corresponding payload data was created in response to sensor data generated by the wireless network node.

3. The method of claim 2, wherein the field specifies a timestamp value relative to a network synchronized clock time, the identifying further including setting the timestamp value to one of:
earlier than the network synchronized clock time for higher priority data based on data type;
substantially coincident with the network synchronized clock time for sensor data; or
later than the network synchronized clock time for lower priority data based on the corresponding data type.

4. The method of claim 1, wherein the identifying is based on:
the wireless network node receiving the data packet from a second wireless network node via the wireless mesh network; and
the wireless network node determining the age since the corresponding payload data was created based on parsing a prescribed field in the data packet.

5. The method of claim 4, wherein the prescribed field specifies at least one of a timestamp value specifying a time that the corresponding payload data was created, or an explicit age value specifying the age of the corresponding payload data accumulated since when the payload data was created, including queuing delay and transmission of the data packet by the second wireless network node.

6. The method of claim 4, wherein the wireless network node determines the age of the corresponding payload data based on comparing a timestamp value, specifying a time that the corresponding payload data was created, with a current time value of network synchronized clock time for the wireless mesh network.

7. The method of claim 1, wherein:
the determining the schedule is based on the wireless network node calculating an expected schedule for the data packet to reach the multi-hop destination before expiration of a latency budget based on a determined number of hops from a source of the payload data to the multi-hop destination;
the prioritizing including one of queuing the data packet to a higher priority based on the corresponding age indicating the data packet was received behind the schedule relative to the wireless network node and the determined number of hops, or queuing the data packet to a lower priority based on the corresponding age indicating the data packet was received ahead of the schedule relative to the wireless network node and the determined number of hops.

8. The method of claim 1, wherein:
the determining the schedule is based on the wireless network node receiving the schedule from a management agent for the wireless mesh network, the schedule identifying data flows within the wireless mesh network,
the prioritizing queuing based on determining whether the data packet, identified as associated with one of the data flows, is early, on-time, or late with respect to the schedule for the corresponding one data flow, relative to the schedules of the other data packets awaiting transmission.

9. Logic encoded in one or more non-transitory tangible media for execution and when executed by a machine operable for:
identifying an age of payload data in a data packet by a wireless network node configured for transmitting the data packet to a multi-hop destination via a wireless mesh network;
determining by the wireless network node a schedule for the data packet reaching the multi-hop destination; and
the wireless network node prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the wireless network node to the destination, where a higher-aged data packet relative to the schedule is granted a higher priority than a lower-aged data packet relative to the schedule.

10. The logic of claim 9, wherein the identifying is based on the wireless network node setting a field in the data packet indicating the age since the corresponding payload data was created in response to sensor data generated by the wireless network node.

11. The logic of claim 10, wherein the field specifies a timestamp value relative to a network synchronized clock time, the identifying further including setting the timestamp value to one of:
  earlier than the network synchronized clock time for higher priority data based on data type;
  substantially coincident with the network synchronized clock time for sensor data; or
  later than the network synchronized clock time for lower priority data based on the corresponding data type.

12. The logic of claim 9, wherein the identifying is based on:
  the wireless network node receiving the data packet from a second wireless network node via the wireless mesh network; and
  the wireless network node determining the age since the corresponding payload data was created based on parsing a prescribed field in the data packet.

13. The logic of claim 12, wherein the prescribed field specifies at least one of a timestamp value specifying a time that the corresponding payload data was created, or an explicit age value specifying the age of the corresponding payload data accumulated since when the payload data was created, including queuing delay and transmission of the data packet by the second wireless network node.

14. The logic of claim 12, wherein the wireless network node determines the age of the corresponding payload data based on comparing a timestamp value, specifying a time that the corresponding payload data was created, with a current time value of network synchronized clock time for the wireless mesh network.

15. The logic of claim 9, wherein:
  the determining the schedule is based on the wireless network node calculating an expected schedule for the data packet to reach the multi-hop destination before expiration of a latency budget based on a determined number of hops from a source of the payload data to the multi-hop destination;
  the prioritizing including one of queuing the data packet to a higher priority based on the corresponding age indicating the data packet was received behind the schedule relative to the wireless network node and the determined number of hops, or queuing the data packet to a lower priority based on the corresponding age indicating the data packet was received ahead of the schedule relative to the wireless network node and the determined number of hops.

16. The logic of claim 9, wherein:
  the determining the schedule is based on the wireless network node receiving the schedule from a management agent for the wireless mesh network, the schedule identifying data flows within the wireless mesh network,
  the prioritizing queuing based on determining whether the data packet, identified as associated with one of the data flows, is early, on-time, or late with respect to the schedule for the corresponding one data flow, relative to the schedules of the other data packets awaiting transmission.

17. An apparatus comprising:
  a memory circuit configured for storing a data packet containing payload data;
  a wireless network interface circuit configured for transmitting the data packet to a multi-hop destination via a wireless mesh network, the apparatus implemented as a wireless network node; and
  a processor circuit configured for:
  identifying an age of the payload data,
  determining a schedule for the data packet reaching the multi-hop destination, and
  prioritizing queuing of the data packet for Collision Sense with Multiple Access and Collision Avoidance (CSMA-CA) based wireless transmission in the wireless mesh network based on the corresponding age, relative to the schedule and respective ages of other data packets awaiting transmission by the apparatus to the destination, where a higher-aged data packet relative to the schedule is granted a higher priority than a lower-aged data packet relative to the schedule.

18. The apparatus of claim 17, wherein the identifying is based on:
  the wireless network node receiving the data packet from a second wireless network node via the wireless mesh network; and
  the processor circuit configured for determining the age since the corresponding payload data was created based on parsing a prescribed field in the data packet.

19. The apparatus of claim 17, wherein:
  the determining the schedule is based on the processor circuit calculating an expected schedule for the data packet to reach the multi-hop destination before expiration of a latency budget based on a determined number of hops from a source of the payload data to the multi-hop destination;
  the processor circuit configured for prioritizing the data packet based on one of queuing the data packet to a higher priority based on the corresponding age indicating the data packet was received behind the schedule relative to the wireless network node and the determined number of hops, or queuing the data packet to a lower priority based on the corresponding age indicating the data packet was received ahead of the schedule relative to the wireless network node and the determined number of hops.

20. The apparatus of claim 17, wherein:
  the processor circuit is configured for determining the schedule based on the wireless network node receiving the schedule from a management agent for the wireless mesh network, the schedule identifying data flows within the wireless mesh network;
  the processor circuit is configured for prioritizing queuing based on determining whether the data packet, identified as associated with one of the data flows, is early, on-time, or late with respect to the schedule for the corresponding one data flow, relative to the schedules of the other data packets awaiting transmission.

* * * * *